United States Patent [19]
Côte et al.

[11] Patent Number: 6,126,092
[45] Date of Patent: Oct. 3, 2000

[54] TWIN CHOPPER DEVICE FOR SPRAY-UP MOLDING

[75] Inventors: Marc Côte, Acton Vale; Jean-François Ferland, Richmond; Sylvain Gagne, Granby, all of Canada

[73] Assignee: Camoplast, Inc., Quebec, Canada

[21] Appl. No.: 09/325,424

[22] Filed: Jun. 4, 1999

[51] Int. Cl.[7] .............................. F23D 11/16; B05B 7/14
[52] U.S. Cl. ..................... 239/422; 239/306; 239/325; 239/336; 239/DIG. 8
[58] Field of Search ................................. 239/306, 325, 239/336, 418, 420, 422, 428, 433, DIG. 8

[56] References Cited

U.S. PATENT DOCUMENTS

| | | | |
|---|---|---|---|
| 3,096,225 | 7/1963 | Carr et al. | 239/422 X |
| 3,606,154 | 9/1971 | Tufts | 239/422 X |
| 3,801,009 | 4/1974 | Marshall | 239/9 |
| 3,927,833 | 12/1975 | Harrison et al. | 239/336 X |
| 3,947,962 | 4/1976 | Smith et al. | 30/128 |
| 3,986,672 | 10/1976 | Smith et al. | 239/394 |
| 4,081,904 | 4/1978 | Krohn et al. | 30/128 |
| 4,390,336 | 6/1983 | Ziegler | 425/82.1 |
| 4,770,117 | 9/1988 | Hetherington et al. | 118/300 |
| 5,064,120 | 11/1991 | Luttrell, Jr. | 239/74 |
| 5,186,388 | 2/1993 | Chapman et al. | 239/420 X |
| 5,697,560 | 12/1997 | Bennett | 241/29 |

*Primary Examiner*—Andres Kashnikow
*Assistant Examiner*—Steven J. Ganey
*Attorney, Agent, or Firm*—W. Warren Taltavull; Farkas & Manelli PLLC

[57] ABSTRACT

The twin chopper of the present invention consists of a pair of roving choppers, each chopper being disposed on either side of a resin spraying nozzle. Each chopper comprises a rotatably driven cutter roller, a rotatable friction roller cooperating with the cutter roller, and an idler roller cooperating with the friction roller for feeding roving strands between the friction roller and the cutter roller. The outlet of the first chopper is so disposed relative to the nozzle as to discharge cut rovings over and onto the flat spray of resin while the outlet of the second chopper is so disposed relative to the nozzle as to discharge cut rovings under and onto the flat spray so that the resin spray is coated with roving cuts on both sides thereof from both choppers as the spray is directed onto the open mold surface.

6 Claims, 6 Drawing Sheets

TWIN CHOPPER DEVICE FOR SPRAY-UP MOLDING

FIELD OF THE INVENTION

The present invention relates to an improved roving chopping device used in combination with a resin spray gun for spraying a mixture of resin and glass fiber onto an open mold surface.

BACKGROUND OF THE INVENTION

In the industry of composite material, for structural and cosmetic products having dimensions of some importance, the projection of fiber glass followed up by lamination is a process which has been used for quite sometime. It has always occupied an important part of small lot market due to the low cost of molds which is balanced off by the high cost of manpower. In the 90's, the robotization of this process has enable to accelerate the production cycle, to reduce thickness variations and, consequently, to considerably increase the profitability of higher volume lots.

In general, the process consist in projecting a coating of unsaturated polyester or in thermoforming an acrylic sheet on an open mold. Thereafter, chopped glass fibers are added simultaneously with a catalyzed liquid resin by either manual or robotized projection. Thereafter, lamination is carried out and air bubbles or voids are removed with rollers and brushes. The resin then solidifies, the work piece is demolded and machine-finished, and trimming completes the making of the product.

A cutter roller (or chopper) serves to cut (more exactly break) from one to four continuous strands of glass fibers to a useful length of about 0.5" to 2" according to the mechanical requisites of the product. The cut fibers are simultaneously projected on a flat and elliptical stream of resin, which is projected under high pressure through a minuscule gun orifice to confer to the spray a high kinetic energy which carries the cut fibers towards the mold. The projections of glass fibers and resin are adjusted in order to obtain a ratio adequate to provide the desired mechanical properties of the product to be molded.

The cutter roller is generally pneumatically driven (it is sometimes hydraulic) as it is used in a medium of volatile materials that are inflammable and potentially explosive. Furthermore, this tool has been historically, and is still being used, manually or mounted on paint robots having a low payload. It has therefore been required to limit the weight of this equipment.

The glass fibers are directed on only one side of the resin stream where they are wetted and brought to the mold. With glass/volume ratios of 12%, and more, an important part of the cut fibers do not penetrate the resin stream and slide therealong. Hence, depending on the traveling direction of the cutter and the resin gun, a rich mixture of resin is obtained on one side but a poor mixture is present on the other side; hence, when lamination is then carried out on the mixture, this difference creates conformation variations and high risk of air bubbles or voids while contributing to varying thicknesses. One must therefore allow more time to carry the lamination/debubbling steps of the mixture than to project it. Furthermore, the presence of areas which are resin rich near the coating favours the creation of cracks under stress conditions occurring during the use and operation of the molded product.

There are two methods of applying such material to an open mold. One named "deposition in an airless environment" consists of a robotized projection carried out under vacuum conditions of cut glass fiber roving and a catalyzed resin. This process enables to eliminate micro-bubbles which expand under furnace heat. It also provides for an important reduction in manpower, in lamination and in finishes and repairs. An immediate conformation of the fibrous mixture is achieved wherever a radius of curvature in the mold enables an impact at about 90°. The smaller radii of curvature are laminated since fibers having a length of about 1" to 1¼" form bridges over these radii. The conformation by lamination must be facilitated by the absence of air trapped under these compact bridges.

A second method is used for fiberglass products which are cosmetic as well as structural; the process requires production cycles which are relatively high and operates at ambient temperature. The products obtained by this process are those having a colored gel coat finish. Hence, for these products, the micro air bubbles (less than 1 mm) which are formed during atomization under atmospheric conditions have no effect.

This method consists also of a robotized projection of cut fiberglass roving and of a catalyzed resin but carried out under atmospheric condition. In projecting multiple fine layers, an immediate conformation of the fibers mixture is obtained everywhere where the radius of curvature of the mold enables an impact at about 90°. The smaller radii are laminated since fibers having a length of 1" to 1¼" form bridges over these radii.

The air bubbles (smaller than ¼") which may remain are almost always located in radii which are highly structural and not much subject to impact during use. Hence, there is previously added between the gel coat and the fibrous substrate a flexible barrier layer which is resistant to impact. When this barrier is added in sufficient thickness, the radius of curvature is reduced thereby facilitating the conformation of the spray and providing protection against bubble puncturing. The barrier layer also improves the cosmetic aspect of the external finish (gel coat).

The above two methods greatly reduces lamination, which enables to better control the thickness of the sprayed material.

STATEMENT OF THE INVENTION

It has been found that in order to obtain high conformation of the spray without the presence of micro bubbles in the above two methods, it is required to provide a resin of high wetness and of superior thixotropy, a continuous filament strand of rapid wetting, a resin spray which is not atomized and a twin chopper, which is the object of the present invention.

The twin chopper of the present invention consists of a pair of roving choppers, each chopper being disposed on either side of a resin spraying nozzle. Each chopper comprises a rotatably driven cutter roller, a rotatable friction roller cooperating with the cutter roller, and an idler roller cooperating with the friction roller for feeding roving strands between the friction roller and the cutter roller; input means receive strands of roving and feed them between the idler roller and the friction roller; and roving discharging outlet means adjacent the nozzle discharge the cut roving. The outlet means of the first chopper are so disposed relative to the nozzle as to discharge cut rovings over and onto the flat spray of resin while the outlet means of the second chopper are so disposed relative to the nozzle as to discharge cut rovings under and onto the flat spray so that the resin spray is coated with roving cuts on both sides thereof from both said choppers as the spray is directed onto the open mold surface.

By adding a second rotatable cutter assembly, which is a mirror image of the first cutter assembly on the other side of the resin spray and by directing an even quantity of cut fibers on both sides of the resin spray and at substantially the same discharging speed, the contact surface is doubled and an adequate centering and uniform distribution of the glass fibers in the resin is achieved.

In one preferred form of the invention, the fibers are directed to the resin spray at an angle varying between 45° and 60° relative to the plane of the spray.

With resins and rapid wetting filaments, an instantaneous improved compaction can be obtained which enables to reduce considerably manpower used for the formation of the mixture of cut fibers and resin and for the repair of entrapped air bubbles. Lamination is also reduced thereby enabling a better control of the thickness of the sprayed material as compared to the conventional methods of spray-up molding.

Since the use of two cutters with pneumatic motors (such as is presently used) would be too heavy and voluminous for a manual projection and for the present types of robots the present invention uses an assembly of two rotatable cutters which are driven from a distance by an electric motor using flexible transmission cables and gear means.

The benefits of a device made in accordance with the present invention combine the effects of load reduction at the extremity of the robot arm, the torque constancy independently of the position of the robot and, consequently, of the filament discharge, as well as an acceleration/deceleration cycle of about less than a second (conventional systems require more than 6 seconds with pneumatic motors). Furthermore, the cutting speed no longer affects the performances since it is now possible to have a motor with a much higher torque. Such driving enables to achieve projections with very high or very low fiber glass discharge.

Furthermore, the chopper device of the present invention enables to apply a constant pressure on the blades of the rubber cutter rollers. A small pneumatic cylinder, which is pressure regulated, displaces the axis of the rubber roller to and from the blade roller. Notwithstanding the wear of the blades, the cutting pressure is maintained constant, which increases the useful life of the components. The withdrawal action of the roller enables rapid and more efficient maintenance interventions.

Further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
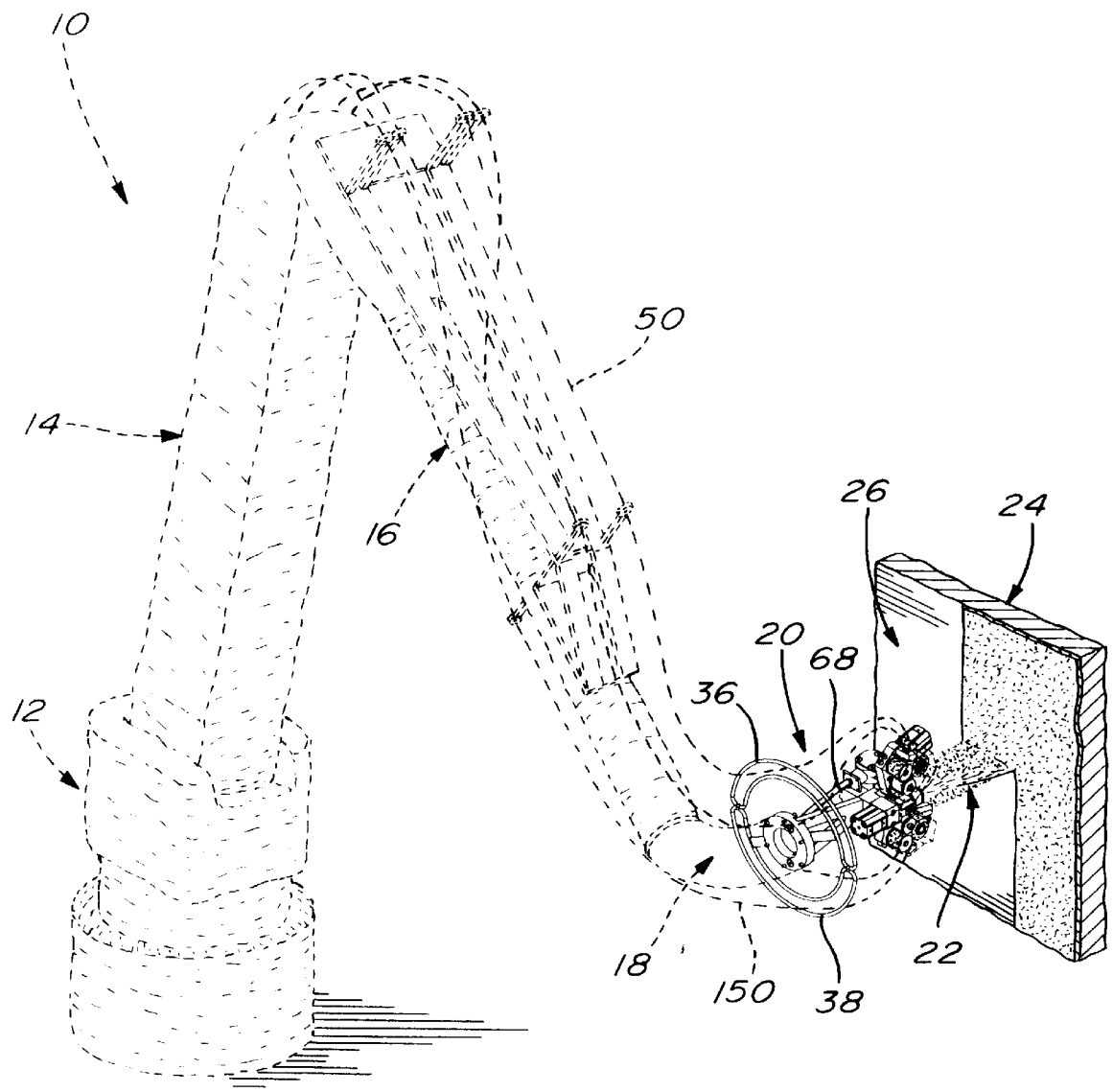
FIG. 1 is a perspective view of a twin chopper device made in accordance with the present invention shown mounted at the end of a robot arm shown in dotted lines.

Referring to FIG. 1, there is shown in dotted lines a robot 10 consisting of a series of articulatable sections 12, 14, 16 and 18; the construction of such robot is well known in the field of spray-up molding and needs not be described in detail. A twin chopper device made in accordance with the present invention, generally identified at 20, is mounted to the robot arm section 18 for spraying a stream 22 consisting of a mixture of resin and chopped glass fibers onto a mold surface 24 which is usually coated with a gel coat 26.

Figure 2:
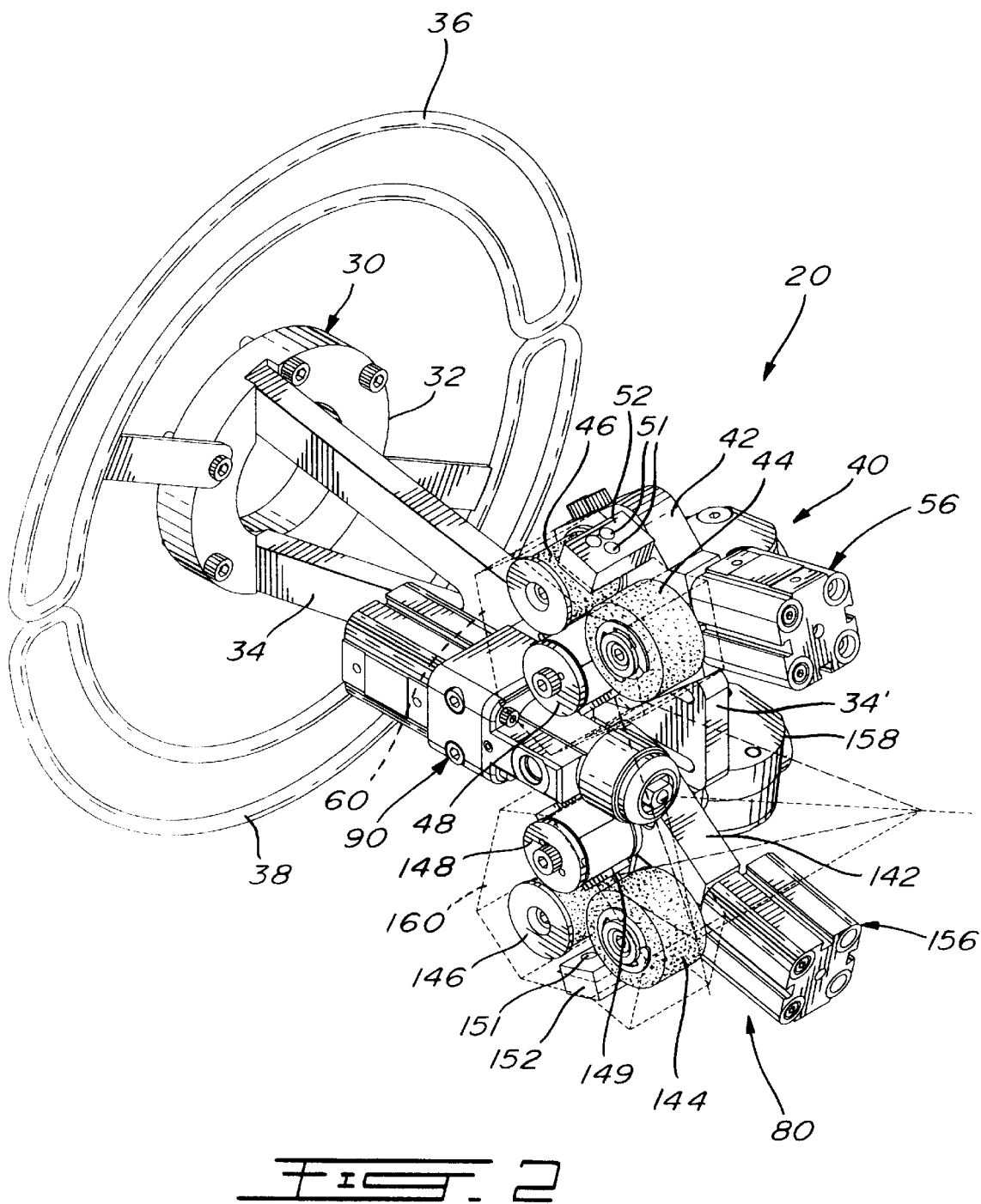
FIG. 2 is a perspective enlarged view of the twin chopper device.

Referring to FIG. 2, the twin chopper device includes a support assembly 30 for connecting the chopper device to the robot arm. The support assembly comprises a central annular bracket 32 adapted to be connected to the robot arm section and to which is mounted a V-shaped supporting frame 34 and two semi annular loops 36 and 38 used to allow passage of fiberglass filaments therethrough, as further described hereinbelow.

Figure 3:
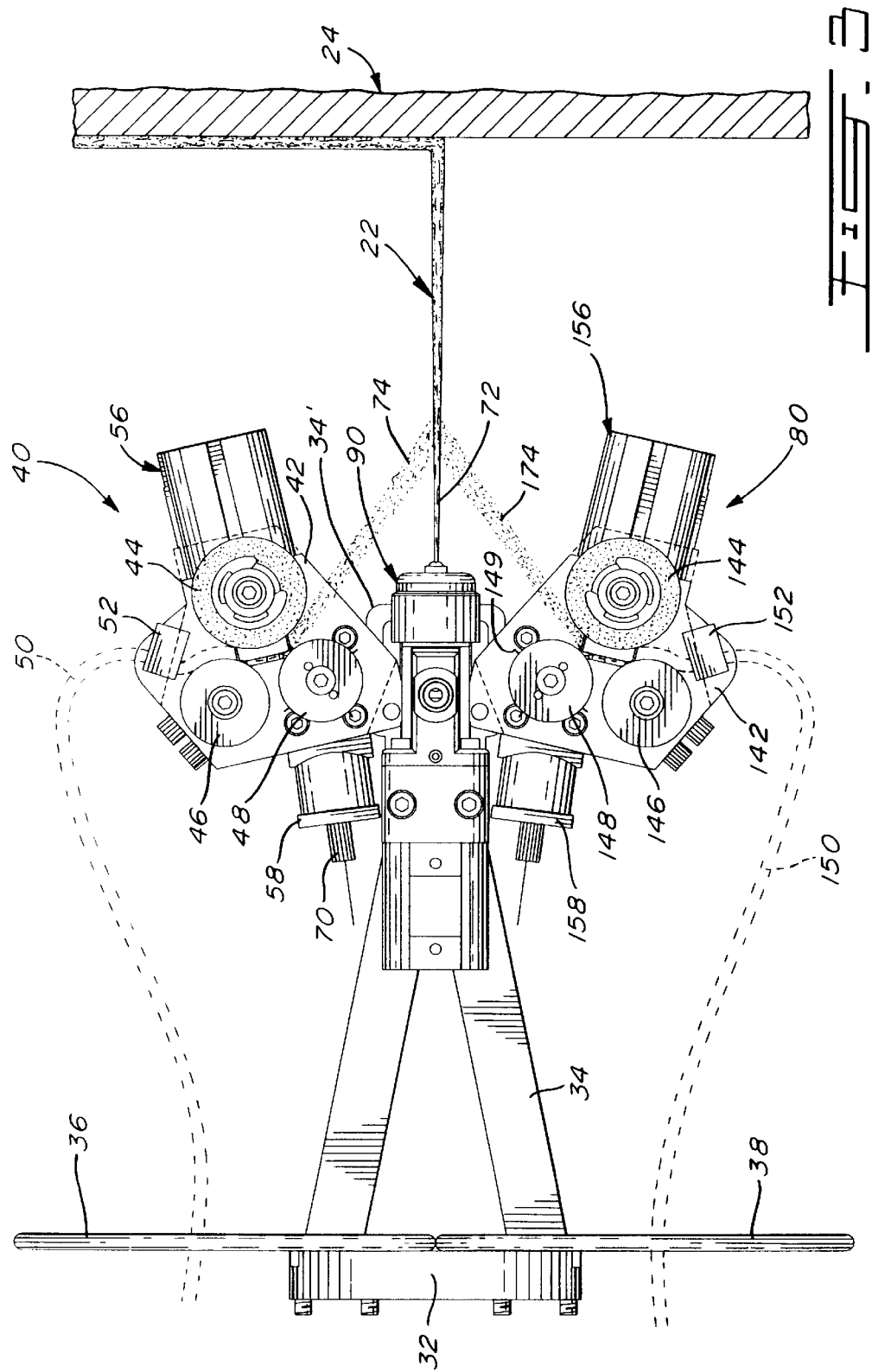
FIG. 3 is a side view thereof.
Figure 4:
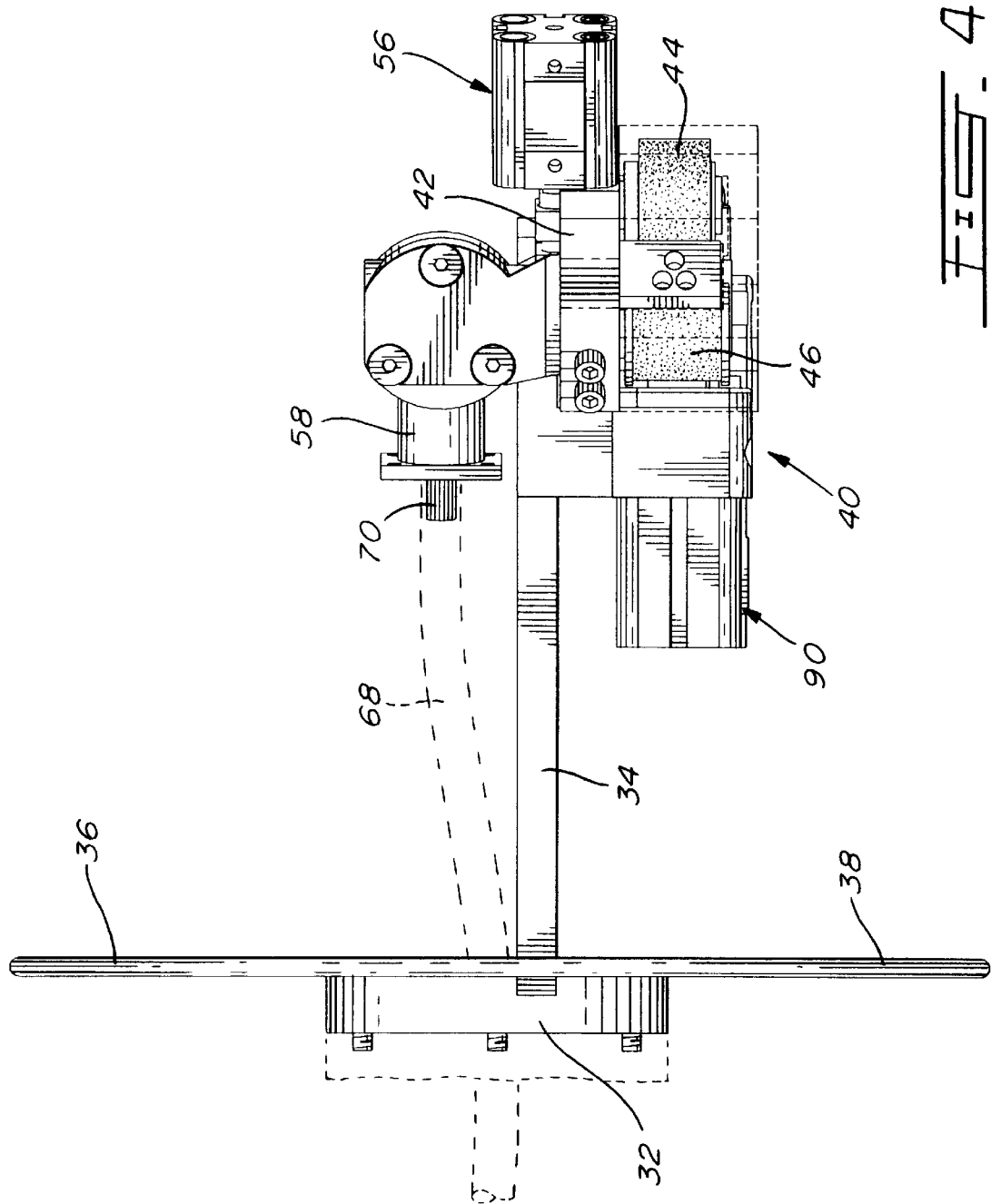
FIG. 4 is a top view thereof.
Figure 5:
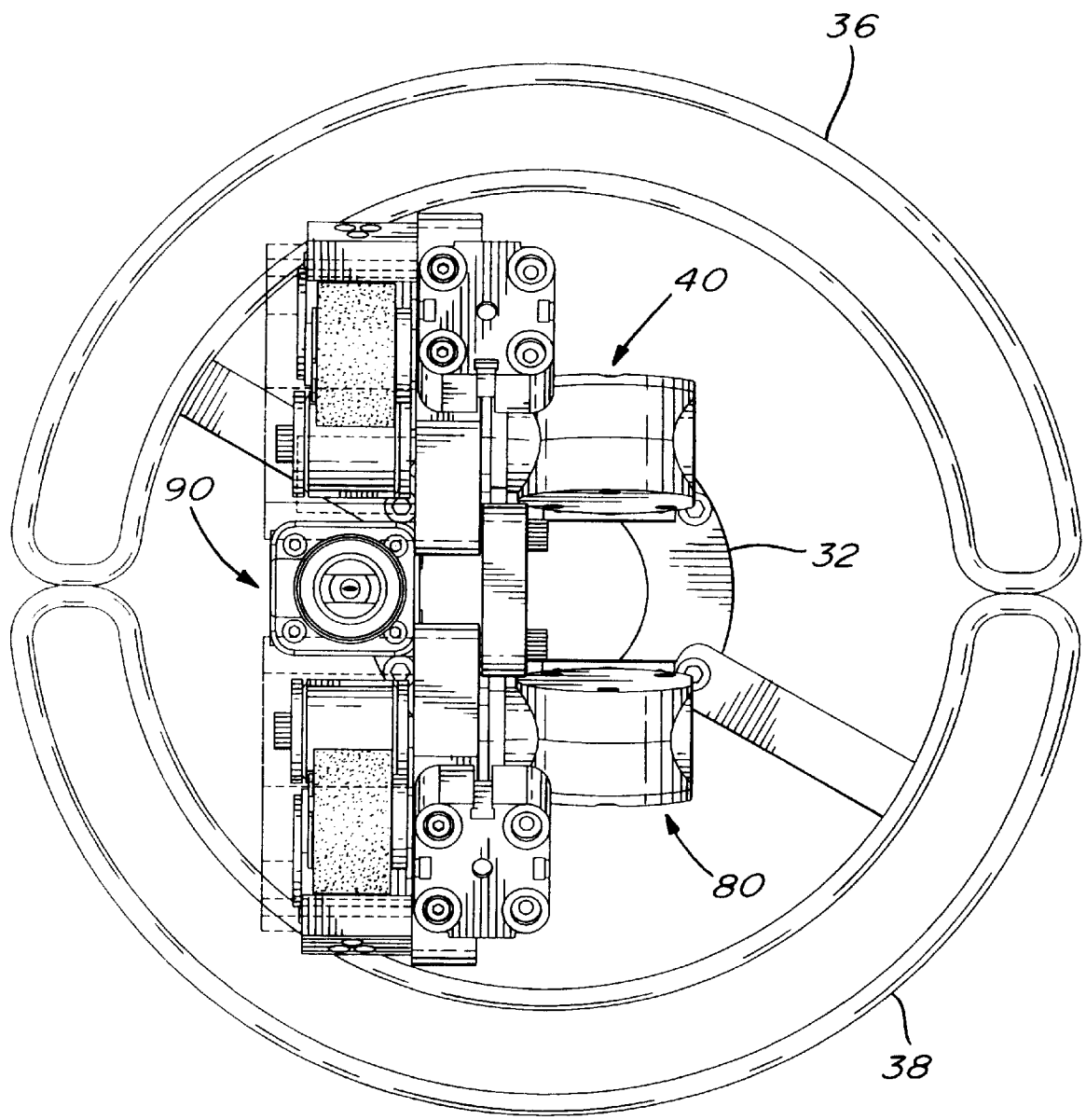
FIG. 5 is a front view thereof.

Referring also to FIGS. 3, 4 and 5, the twin chopper device includes a pair of chopper units 40 and 80 disposed on either side of a spray gun unit 90.

The upper chopper unit 40 includes a mounting plate 42 secured to the extremity 34' of the V-shaped support 34. Three rollers 44, 46, 48 are mounted to plate 42. Roller 44 is called a pressure roller and has a peripheral rubber covering 45 (see FIG. 6). Roller 46 is a guiding roller for the roving filaments 50 received from a filament supply (not shown) and through the semi-annular loop 36. Roller 48 is a cutter roller having a series of circumferentially spaced blades 49 (see FIG. 6). Also mounted to plate 42 is a guide 52 having a series of holes 51 (these being shown) for directing the fiberglass filaments 50 between rolls 44 and 46. An adjusting assembly 56 is also mounted to the plate 42 to allow adjustment of the pressure roller 44 with respect to the cutter roller 48. A gear drive unit 58 is drivenly connected to the cuter roller 48 to transmit rotational drive from an electrical drive source (not shown) to the roller.

The lower chopper unit 80 is identical in construction to the upper chopper unit 40; it includes a mounting plate 142 secured to the extremity 34' of the V-shaped support 34. Three rollers 144, 146, 148 are mounted to plate 142. Roller 144 is the pressure roller and has a peripheral rubber covering similar to the rubber covering 45. Roller 46 is the guiding roller for the roving filaments 150 received from a filament supply (not shown) and through the semi-annular loop 38. Roller 148 is the cutter roller having a series of circumferentially spaced blades 149. Also mounted to plate 142 is a guide 152 having one or more holes 152 for directing the fiberglass filaments 150 between the rolls 144 and 146. An adjusting assembly 156 is also mounted to the plate 142 to allow adjustment of the pressure roller 144 with respect to the cutter roller 148. A gear drive unit 158 is drivenly connected to the cuter roller 148 to transmit rotational drive from an electrical drive source (not shown) to the roller.

The spray gun 90 is of a construction well known in the art and will not be described in detail. Its function is to provide a stream of resin 72 directed to the mold wall 24.

The three rollers of each chopper unit are disposed in an isosceles triangle pattern and are enclosed in a housing 60, 160 shown in dotted lines.

Figure 6:
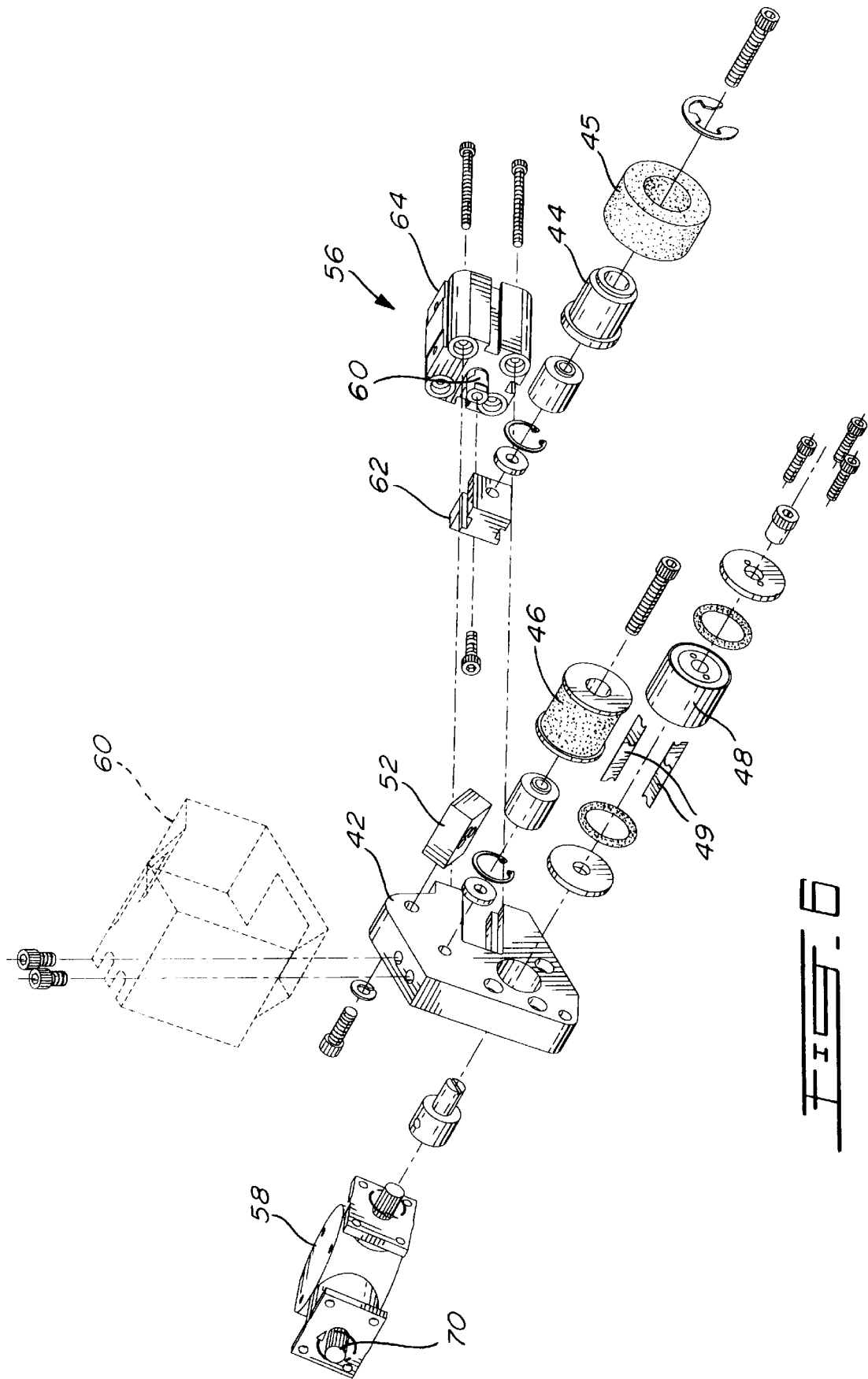
FIG. 6 is an exploded view showing various components of one chopping section of the twin chopper device.

FIG. 6 shows a detailed construction of one of the chopper units in which the major components have been identified; the exploded view of the unit shows all the various components required to mount these major components to the plate 42. The adjusting assembly 56 includes a slider 62 to which is mounted the pressure roller 44; it is slidably mounted to a cylinder housing 64 so as to enable the pressure roller 44 to be adjustably moved against the cutter roller 48, and its blades 49 and to maintain a constant pressure. The rollers may have equal or unequal diameters. The pressure between the blade roller 48 and the rubber roller 44 is automatically adjusted by a cylinder 66 slidably mounted in the housing 64 and connected to slider 62 to which is secured the roller 44. The latter is maintained in constant pressure against roller 48 by a pneumatic control valve (not shown) acting on the cylinder 66.

The driving of the roller 48 via the gear drive 58 is achieved by flexible transmission cables, one of which is shown as 68 in FIG. 4 and is adapted to be connected to knob 70.

In operation, a series of fiberglass filaments 50, 150 extending through respective loops 36 and 38 are inserted into the openings 51, 151 of the guides 52, 152 and passed between rollers 44, 46 (144, 146) and then between rollers 44, 48 (144, 148) where they are chopped into small lengths. The chopped glass fibers 74, 174 are projected by their respective rollers onto a respective side of the resin spray 72 which has a flat elliptical shape so that the resulting stream 22 consists of two layers of chopped glass fibers over a layer of resin.

Although the invention has been described above with respect with one specific form, it will be evident to a person skilled in the art that it may be modified and refined in various ways. It is therefore wished to have it understood that the present invention should not be limited in scope, except by the terms of the following claims.

What is claimed is:

1. In combination with a resin spray gun suitable for spraying a flat stream of resin from a nozzle onto an open mold, a twin chopper comprising first and second roving choppers, each chopper being disposed on either side of the nozzle and each comprising a rotatably driven cutter roller, a rotatable friction roller cooperating with said cutter roller, and an idler roller cooperating with said friction roller for feeding roving strands between said friction roller and said cutter roller; input means receiving strands of rovings and feeding said roving strands between said idler roller and said friction roller; roving discharging outlet means adjacent said gun nozzle for discharging cut rovings; said outlet means of said first chopper being disposed relative to said nozzle to discharge cut rovings over and onto the spray of resin; said outlet means of said second chopper being disposed relative to said nozzle to discharge cut rovings under and onto said spray wherein said resin spray is thereby coated on both sides thereof with roving cuts from both said choppers as said spray is directed onto said open mold.

2. A twin roving chopper device as defined in claim 1, wherein said cut rovings from said first and second choppers are discharged onto a flat plane of spray at an angle varying between 45° and 60° relative to said plane of the spray.

3. A twin roving chopper device as defined in claim 1, wherein each chopper comprises actuator means for displacing the friction roller relative to the cutter roller.

4. A twin roving chopper device as defined in claim 3, wherein each said actuator means comprising a housing having a pneumatically actuated cylinder slidably mounted therein and connected to a slider connected to said friction roller.

5. A twin roving chopper device as defined in claim 1, further comprising separate driving means for driving the cutter roller of each chopper.

6. A twin roving chopper device as defined in claim 5, wherein said driving means are electrically driven by means of flexible cables.

* * * * *